United States Patent [19]

Ramirez

[11] 4,337,175
[45] Jun. 29, 1982

[54] CATALYST FOR THE PREPARATION OF ETHYLENIMINE

[75] Inventor: Enrique G. Ramirez, Lake Jackson, Tex.

[73] Assignee: The Dow Chemical Company, Midland, Mich.

[21] Appl. No.: 167,881

[22] Filed: Jul. 14, 1980

[51] Int. Cl.$^3$ ............................................. B01J 23/20
[52] U.S. Cl. ............................... 252/455 R; 252/456; 252/464; 252/475
[58] Field of Search ............ 252/456, 464, 475, 455 R

[56] References Cited

U.S. PATENT DOCUMENTS

| | | | |
|---|---|---|---|
| 2,217,010 | 10/1940 | Grosse et al. | 252/475 X |
| 2,319,452 | 5/1943 | Grosse et al. | 252/464 X |
| 2,773,053 | 12/1956 | Field et al. | 252/475 X |
| 2,810,760 | 10/1957 | Gabbett, Jr. | 252/475 X |
| 3,014,899 | 12/1961 | Engel | 252/464 X |
| 3,336,294 | 8/1967 | Miller et al. | 260/239 |
| 3,342,847 | 9/1967 | Kruse | 252/475 X |
| 3,723,560 | 3/1973 | Gleim et al. | 252/464 X |
| 4,131,643 | 12/1978 | Utsunomiya et al. | 252/464 X |

FOREIGN PATENT DOCUMENTS 50-10593 of 1975 Japan .

*Primary Examiner*—Carl F. Dees
*Attorney, Agent, or Firm*—A. Cooper Ancona

[57] ABSTRACT

An improved catalyst suitable for the dehydration of an alkanolamine in the vapor phase to produce an alkylenimine which catalyst contains an oxide of niobium or tantalum. Optionally an alkaline earth oxide is employed as a promoter. The catalyst is generally used on an inert low surface area support at a concentration of less than 5% of the tantalum or niobium oxide and less than 0.5% of the promoter oxide.

5 Claims, No Drawings

CATALYST FOR THE PREPARATION OF ETHYLENIMINE

This invention relates to the preparation of ethylenimine by a catalytic dehydration of monoethanolamine in the vapor phase over a new and improved catalyst therefor.

BACKGROUND OF THE INVENTION

Ethylenimine (EI) is an active three-membered cyclic amine and is a very useful compound since it can introduce an amino group by an addition reaction, substitution reaction, ring opening reaction and the like. Ethylenimine is especially important as an aminoethylation agent of compounds containing an active hydrogen. It is also useful as a monomer for polyaminetype polymers in homo and co-polymerizations. In addition to all of these uses, it is also possible to prepare derivatives which retain the ring opening reactivity of ethylenimine through an addition reaction of the amino group. All of these features make ethylenimine an important substance both chemically and industrially.

Ethylenimine can be synthesized by one of several methods. One is the Gabriel method in which a beta-halo-ethylamine undergoes a ring closure through a treatment with a concentrated base or silver oxide. Another involves the reaction of ethylene chloride (1,2-dichloroethane) with anhydrous ammonia in the presence of a base. This reaction and equivalent reactants to form EI and substituted EI's are disclosed in U.S. Pat. No. 3,336,294. Yet another preparation of EI involves a decomposition (ring closure) of monoethanolamine sulfuric acid ester by hot concentrated base. Each of the above methods present certain disadvantages. For example, it is necessary to control the reaction conditions strictly to synthesize both beta-haloethyl amine and monomethanolamine sulfuric acid ester. The syntheses tend to be accompanied by side reaction and side products. All of these problems make these starting materials very expensive. At the same time, the halogen and sulfuric acid ester group which are introduced in the syntheses are removed in the subsequent process making these syntheses wasteful from the stand point of the functional group utilization. Furthermore, both processes use a base for the ring closure reaction. The bases most often used are sodium hydroxide and potassium hydroxide and these bases are used as concentrated solutions in large quantities. Thus the base requirement per ethylenimine unit is very high and uneconomical. The by products, NaCl, $Na_2SO_4$ or the potassium equivalents, are a further expense since they have little value and must be disposed of. The lost chlorine values in the method using 1,2 dichloroethane makes this process an expensive one. None of the art processes are readily made continuous so as to be more attractive commercially.

A more recent process involving the vapor phase dehydration of monoethanolamine is disclosed in Japanese patent publication No. 50-10593/1975. A catalyst of tungsten oxide alone or preferable with another metal oxide as an assistant is employed. The metal oxide assistant includes lithium, magnesium, tin, bismuth, molybdenum, nickel and aluminum oxides.

The reaction is conducted at a temperature of 350° C. to 450° C. preferably using an inert diluent gas such as ammonia or nitrogen. Conversions of up to 45% and selectivities of as high as 66% are reported.

The present invention is also a vapor phase dehydration of ethanolamine, but employs a different catalyst, namely niobium or tantalum oxide optionally in combination with an alkaline earth oxide as a promoter.

SUMMARY OF THE INVENTION

An improved process for the vapor phase dehydration of monoethanolamine to form ethylenimine which comprises employing a supported catalyst of niobium or tantalum oxide together with an alkaline earth oxide promoter on an inert support, said catalyst being deposited on said support at a loading of less than 5% by weight.

DETAILED DESCRIPTION OF THE INVENTION

Either tantalum or niobium compounds, e.g. halides, can be dissolved in water or in hydrofluoric acid. Once solution is accomplished, it is neutralized with aqueous ammonia to form the hydroxide. This precipitated metal hydroxide (or hydrated oxide) is then dissolved in a carboxylic acid, such as oxalic, which solution is then used to impregnate a catalyst support, e.g. alumina, silica-alumina or silicon carbide, which should have a low surface area, i.e. less than 10 $m^2/g$. The preferred support has a surface area of 0.1 to 1.0 $m^2/g$. The impregnated support is then dried and calcined at a temperature of about 450°–550° C. for 2–4 hours.

The supported catalyst, optionally contains an alkaline earth oxide, e.g. BaO, as a promoter. Such promoter can be applied before or simultaneously with the niobium or tantalum salt solution. It is preferred to apply the promoter first to the support and then apply the Nb or Ta oxide catalyst. The promoter is merely dried on the support, the calcination taking place following application of the catalyst. The promoter is applied so as to provide 0.1 to 0.5% by weight of the alkaline earth oxide based on the finished catalyst. The niobium or tantalum is applied so that the finished catalyst contains from 0.1 to 25% and preferably 0.5 to 5% by weight based on total weight of catalyst, support and promoter.

The catalyst is employed for the dehydration process which is conducted by passing vapors of MEA together with diluent $NH_3$ over the catalyst in a reactor heated to a temperature of 350°–450° C. A preferred temperature is in the range of from about 385° to about 415° C. while a more preferred range is from 390° to 400° C. The diluent is used at a ratio of about 2 to 10 volumes per volume of MEA and preferably the ratio is about 5 to 8.

The following examples illustrate the preparation and use of the catalyst.

EXAMPLE I

Heated 5.0 grams of $NbCl_5$ in 50 cc of water at 60° C. for about one hour, or until solution was complete. The solution was then neutralized with concentrated ammonium hydroxide to a pH of 7.0. The precipitated hydrated niobium oxide was filtered and washed several times with water and was dissolved in 80 cc of a 10 wt. % aqueous oxalic acid solution.

One-half of the solution was used to treat 60 cc of support, which was a low surface area, high purity alumina. It was soaked in the solution and dried at 80° C. until all the solution was taken up by the support. The catalyst was then calcined at 500° C. for three hours.

Over the catalyst (50 cc) was passed at 380° C. a feed of ammonia and monoethanolamine (MEA) at a mole ratio of 6.6/1 and a contact time in the reactor of 0.31 seconds. The MEA conversion was 8.9% with a selectivity to ethylenimine of 80.28%. Other products were acetaldehyde (11.75%), monoethylamine (4.05%), pyrazine (2.66%) and ethylpyrazine (1.27%).

EXAMPLE II

Using the same procedure as in Example I, 5.0 grams $TaCl_5$ was converted to hydrated tantalum oxide and dissolved in 50 cc of 10% oxalic acid.

Calcined 60 cc of support the same as in Example I.

Over the catalyst at 390° C. was passed a feed of ammonia and MEA at a mole ratio of 7.3/1. The contact time was 0.3 seconds. The MEA conversion was 13.83% with an ethylenimine selectivity of 79.25%. Other products were acetaldehyde (7.86%), monoethylamine (1.16%), pyrazine (0.79%), methylpyrazine (0.45%), and ethylpyrazine (10.45%).

EXAMPLE III

The same procedure was followed as Example I, except the support was first treated (60 cc) with 0.2 grams of $Ba(OH)_2$ mixed with 17 cc water, dried and then followed the same procedure as Example I.

The reaction was conducted at 388° C. using a feed having an ammonia to MEA mole ratio of 6.2. The contact time was 0.28 seconds. The MEA conversion was 13.87% with an ethylenimine selectivity of 82.09%. Other products were acetaldehyde (5.32%), ethylamine (6.59%), pyrazine (2.48%), methylpyrazine (0.77%) and ethylpyrazine (2.75%).

I claim:

1. A dehydration catalyst which consists essentially of an oxide of tantalum or niobium together with an alkaline earth oxide as a promoter on an inert support.

2. The catalyst of claim 1 wherein the oxide of niobium or tantalum and promoter is burdened on an inert low surface area support.

3. The catalyst of claim 2 wherein the oxide is present on the support at a concentration of from about 0.1 to 25% based on the total weight of oxide and support.

4. The catalyst of claim 3 wherein the concentration of oxide is from about 0.5 to about 5% by weight.

5. The catalyst of claim 1, 2, 3, or 4 wherein the alkaline earth oxide is barium oxide.

* * * * *